US008380588B2

(12) United States Patent
Batra et al.

(10) Patent No.: US 8,380,588 B2
(45) Date of Patent: Feb. 19, 2013

(54) SIDE-BY-SIDE COMPARISON OF ASSOCIATIONS FOR MULTI-LEVEL BILLS OF MATERIAL

(75) Inventors: Anurag Batra, Union City, CA (US); Qiufeng Zhao, Suzhou (CN)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 12/687,871

(22) Filed: Jan. 14, 2010

(65) Prior Publication Data

US 2011/0173103 A1    Jul. 14, 2011

(51) Int. Cl.
*A01K 5/02*    (2006.01)
*G06Q 10/00*    (2006.01)

(52) U.S. Cl. ............................................. 705/29; 705/7
(58) Field of Classification Search ............ 705/29
See application file for complete search history.

(56) References Cited

U.S. PATENT DOCUMENTS

| 4,827,423 | A  | * | 5/1989  | Beasley et al. ............. 700/96 |
| 5,295,067 | A  |   | 3/1994  | Cho et al. |
| 6,088,625 | A  |   | 7/2000  | Kellstrom, Jr. |
| 8,103,694 | B1 | * | 1/2012  | Topolovac et al. ......... 707/786 |
| 2002/0069164 | A1 | * | 6/2002 | Adam et al. ................. 705/40 |
| 2008/0154660 | A1 | * | 6/2008 | Steinbach et al. ........... 705/7 |

OTHER PUBLICATIONS

"Product Lifecycle Management (PLM) Solutions": Omnify Software—Bill of Material, Jan. 13, 2010.*
Autodesk Productstream—Technical What's New; 7 pages; Copyright 2006.
Enhancement Details—Windchill MPMLink Associative BOM Compare Report; 2 pages; Copyright 2010; Jan. 13, 2010.
100 Tonn Software—Bill of Materials Software; 3 pages; Jan. 13, 2010.
Enovia—Collaborative Product Lifecycle Management; Jan. 13, 2010.
Athena Institute Tutorial—The Impact Estimator for Buildings Version 4 Tutorial; 12 pages; Jan. 13, 2010.
Omnify Software—Product Lifecycle Management (PLM) Solutions; Copyright 2002-2010; Jan. 13, 2010.
LICP—XML Based BOM Modeling for Multiple Views; Copyright 2007; Jan. 13, 2010.

* cited by examiner

*Primary Examiner* — Garcia Ade
(74) *Attorney, Agent, or Firm* — Trellis IP Law Group, PC (57) ABSTRACT

A method includes receiving first parameters and second parameters for a comparison of a first multilevel bill of material and a second multilevel bill of material. Internal items based on the first parameters are compared to determine differences between the internal items in the first multilevel bill of material and the second multilevel bill of material. If an internal item matches in the first multilevel bill of material and the second multilevel bill of material, associations for the matched internal item are compared based on the second parameters to determine differences between the associations in the first multilevel bill of material and the second multilevel bill of material. A report is generated showing a result of the comparing of the internal items and the comparing of the associations, wherein the report shows unmatched internal items and unmatched associations for matched first items. The report can then be displayed.

17 Claims, 6 Drawing Sheets

SIDE-BY-SIDE COMPARISON OF ASSOCIATIONS FOR MULTI-LEVEL BILLS OF MATERIAL

BACKGROUND

Particular embodiments generally relate to computer processing and more specifically to a comparison of multi-level structures.

A bill of material (BOM) is a list of items needed to manufacture an end item or final product. The bill of material is used during the design of the end product. During the design, the list of items that is used in the design may change many times. A user may want to compare different bills of material from different but similar assemblies, or different revision dates for the same assembly to see what has changed.

SUMMARY

Particular embodiments generally relate to comparing a multi-level bill of material. In one embodiment, a method includes receiving one or more first parameters and one or more second parameters for a comparison of a first multilevel bill of material and a second multilevel bill of material. One or more internal items based on the one or more first parameters are compared to determine differences between the one or more internal items in the first multilevel bill of material and the second multilevel bill of material. If an internal item matches in the first multilevel bill of material and the second multilevel bill of material, one or more associations for the matched internal item are compared based on the one or more second parameters to determine differences between the one or more associations in the first multilevel bill of material and the second multilevel bill of material. A report is generated showing a result of the comparison of the one or more internal items and the comparison of the one or more associations, wherein the report shows unmatched internal items and unmatched associations for matched first items. The report can then be displayed.

In one embodiment, a method is provided comprising: receiving one or more first parameters and one or more second parameters for a comparison of a first multilevel bill of material and a second multilevel bill of material; comparing, by a computer processor, one or more internal items based on the one or more first parameters to determine differences between the one or more internal items in the first multilevel bill of material and the second multilevel bill of material; if an internal item matches in the first multilevel bill of material and the second multilevel bill of material, performing: comparing, by the computer processor, one or more associations for the matched internal item based on the one or more second parameters to determine differences between the one or more associations in the first multilevel bill of material and the second multilevel bill of material; generating a report showing a result of the comparing of the one or more internal items and the comparing of the one or more associations, wherein the report shows unmatched internal items and unmatched associations for matched first items; and outputting the report.

In another embodiment, a computer-readable storage medium comprising encoded logic for execution by the one or more computer processors is provided. The logic when executed is executable to: receive one or more first parameters and one or more second parameters for a comparison of a first multilevel bill of material and a second multilevel bill of material; compare, by the one or more computer processors, one or more internal items based on the one or more first parameters to determine differences between the one or more internal items in the first multilevel bill of material and the second multilevel bill of material; if an internal item matches in the first multilevel bill of material and the second multilevel bill of material, perform: compare, by the one or more computer processors, one or more associations for the matched internal item based on the one or more second parameters to determine differences between the one or more associations in the first multilevel bill of material and the second multilevel bill of material; generate a report showing a result of the comparing of the one or more internal items and the comparing of the one or more associations, wherein the report shows unmatched internal items and unmatched associations for matched first items; and outputting the report.

In yet another embodiment, an apparatus is provided comprising one or more computer processors and logic encoded in one or more computer readable storage media for execution by the one or more computer processors. The logic when executed is executable to: receive one or more first parameters and one or more second parameters for a comparison of a first multilevel bill of material and a second multilevel bill of material; compare, by the one or more computer processors, one or more internal items based on the one or more first parameters to determine differences between the one or more internal items in the first multilevel bill of material and the second multilevel bill of material; if an internal item matches in the first multilevel bill of material and the second multilevel bill of material, perform: compare, by the one or more computer processors, one or more associations for the matched internal item based on the one or more second parameters to determine differences between the one or more associations in the first multilevel bill of material and the second multilevel bill of material; generate a report showing a result of the comparing of the one or more internal items and the comparing of the one or more associations, wherein the report shows unmatched internal items and unmatched associations for matched first items; and output the report.

A further understanding of the nature and the advantages of particular embodiments disclosed herein may be realized by reference of the remaining portions of the specification and the attached drawings.

DETAILED DESCRIPTION OF EMBODIMENTS

Particular embodiments compare two multi-level bills of material (BOM) structures. A report is generated that displays the results of the comparison in a side by side manner. The results show components, such as internal items and associations for the internal items, that are different in the multi-level bills of material. Internal items are items that are used to manufacture the end product and associations may be manufacturer parts and/or file attachments. Where an internal item matches, an additional comparison of associations for the matching internal item is performed. A report of the results shows any differences for the internal items, manufacturer parts and/or file attachments. Accordingly, a user may view the report and be able to quickly and efficiently determine the differences between components in bills of material.

Figure 1:
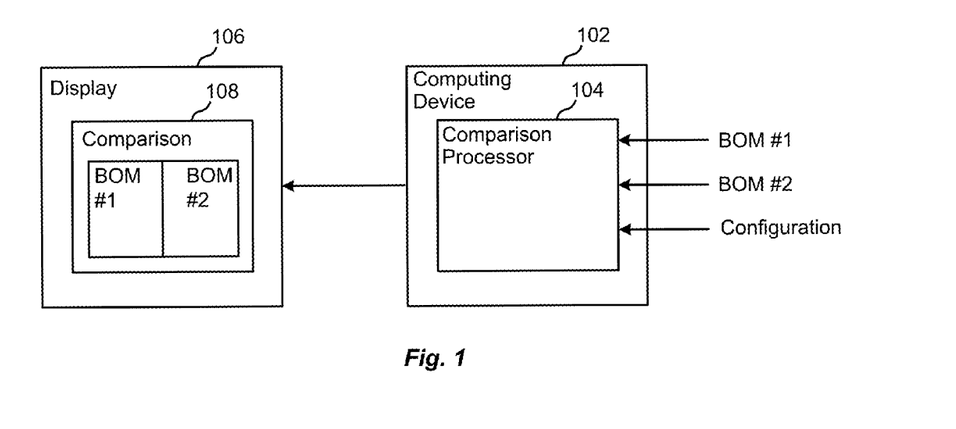
FIG. 1 depicts a simplified system to perform a comparison of bills of material according to one embodiment.

FIG. 1 depicts a simplified system 100 to perform a comparison of bills of material according to one embodiment. System 100 includes a computing device 102 and a display 106.

Computing device 102 may be any computing device, such as a workstation, laptop, personal computer, server, mainframe, etc. Display 106 may be any display that is capable of displaying a report 108. Display 106 may be integrated with may be separate from computing device 102.

Computing device 102 includes a comparison processor 104. Comparison processor 104 may be an application that performs a comparison of bills of material (BOMs). A bill of material may be a list of components, such as raw materials, sub-assemblies, intermediate assemblies, sub-components, manufacturer parts, and file attachments needed to manufacture an item or product. Bills of material may be used to communicate between manufacturing partners or a manufacturing plant.

The bill of material is a hierarchical data structure where a top level represents the product. The product may be the completed product or may be a part or sub-assembly. Additional levels are provided under the product. A first level may be a first level of internal items. An internal item may then include a second level of internal items that are used in it. The number of levels may continue as needed by the design. The bill of material may then be stored in a relational database.

Each internal item may include an association. The association further defines the internal item. For example, the association may be manufacturer parts and/or file attachments. Manufacturer parts and/or file attachments may be stored separately from the bill of material data structure but directly associated with items in the structure. Also, manufacturer parts and/or file attachments may be stored in the bill of material data structure as another level for the internal item.

Comparison processor 104 receives a configuration for a comparison to be performed. The configuration includes parameters that specify which components should be compared and also which attributes should be used in the comparison. For example, components that can be compared include internal items, manufacturer parts, and/or file attachments. The attributes are information about the components that are used to determine if the components match. Examples of attributes include item number, manufacturer part number, filename, and other attributes that will be described later.

Comparison processor 104 uses the configuration to perform a comparison of BOM #1 and BOM #2. Although a comparison of two bills of material is described, it will be understood that any number of bills of material may be compared. Comparison processor 104 may compare internal items to determine any differences between BOM #1 and BOM #2. Additionally, where internal items match, an additional comparison for associations for the matched internal items is performed. For example, for matching internal items, manufacturer parts and attachments may be compared. A comparison for associations of internal items that do not match may not be performed because associations for unmatched internal items are considered not matching by default.

Comparison processor 104 then generates a report for the results of the comparison. The report may be a side-by-side comparison of the multiple levels for the bill of material. This report may be output in an interface 108. The report may highlight differences using notations, such as different colors, or shading.

Figure 2:
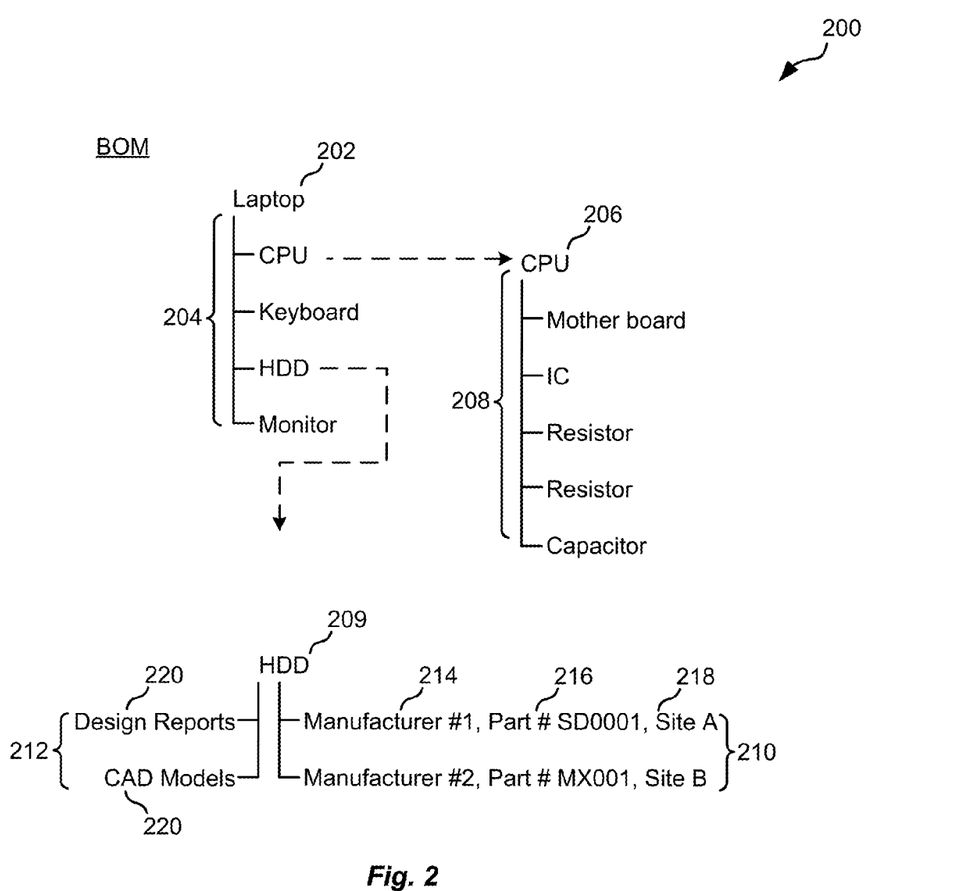
FIG. 2 shows an example of a bill of material according to one embodiment.

FIG. 2 shows an example of a bill of material 200 according to one embodiment. The end product is shown at 202 and is a laptop. This may be the top level of the hierarchy. The laptop includes a central processing unit (CPU), keyboard, hard disk drive (HDD), and monitor. This indicates the laptop is manufactured using these components. These components are shown on a first level of the hierarchy at 204 and are internal items. Each of the internal items may include other components. CPU internal item 206 is shown with additional components on a second level at 208. Here, the CPU includes a motherboard, an integrated circuit (IC), two resistors, and a capacitor. This means that the CPU is manufactured using these components.

An additional level of the internal items provides associations, such as manufacturer parts and file attachments. This is shown for the hard disk drive (HDD) at 209. It will be understood that manufacturer parts and file attachments may also be shown for other components.

Manufacturer parts are shown at 210. In this case, the hard disk drive that is included in the laptop may be a hard disk drive from manufacturer #1 with a part number of SD001 or a hard disk drive from manufacturer #2 with a part number of MX001. This indicates that the hard disk drive for the laptop may be manufactured by a manufacturer #1 or a manufacturer #2 with the part number specified.

Manufacturer parts may include different attributes. In one example, a manufacturer name is shown at 214, a manufacturer part number is shown at 216 and a site is shown at 218. Other attributes may also be appreciated. The manufacturer name is the name of the manufacturer of the part. The manufacturer part number is the part number that the manufacturer or another company assigns to the part. The site may be a site in which the manufacturer part is being used to manufacturer the laptop (e.g., different sites may use different manufacturer parts). The attributes may be used to determine if manufacturer parts match.

File attachments are shown at 212. The file attachments may be additional information for the internal item that can be attached to the internal item in the BOM structure. For example, the file attachments may be design reports, computer-aided design (CAD) models, or other information that may be useful for the hard disk drive. Generally, file attachments are any electronic files associated directly with the internal item.

For file attachments, a file name attribute is shown at 220. The file name attribute is the name assigned to the file. It will be understood that other attributes for file attachments may be appreciated. The attributes may be used to determine if file attachments match.

Figure 3:
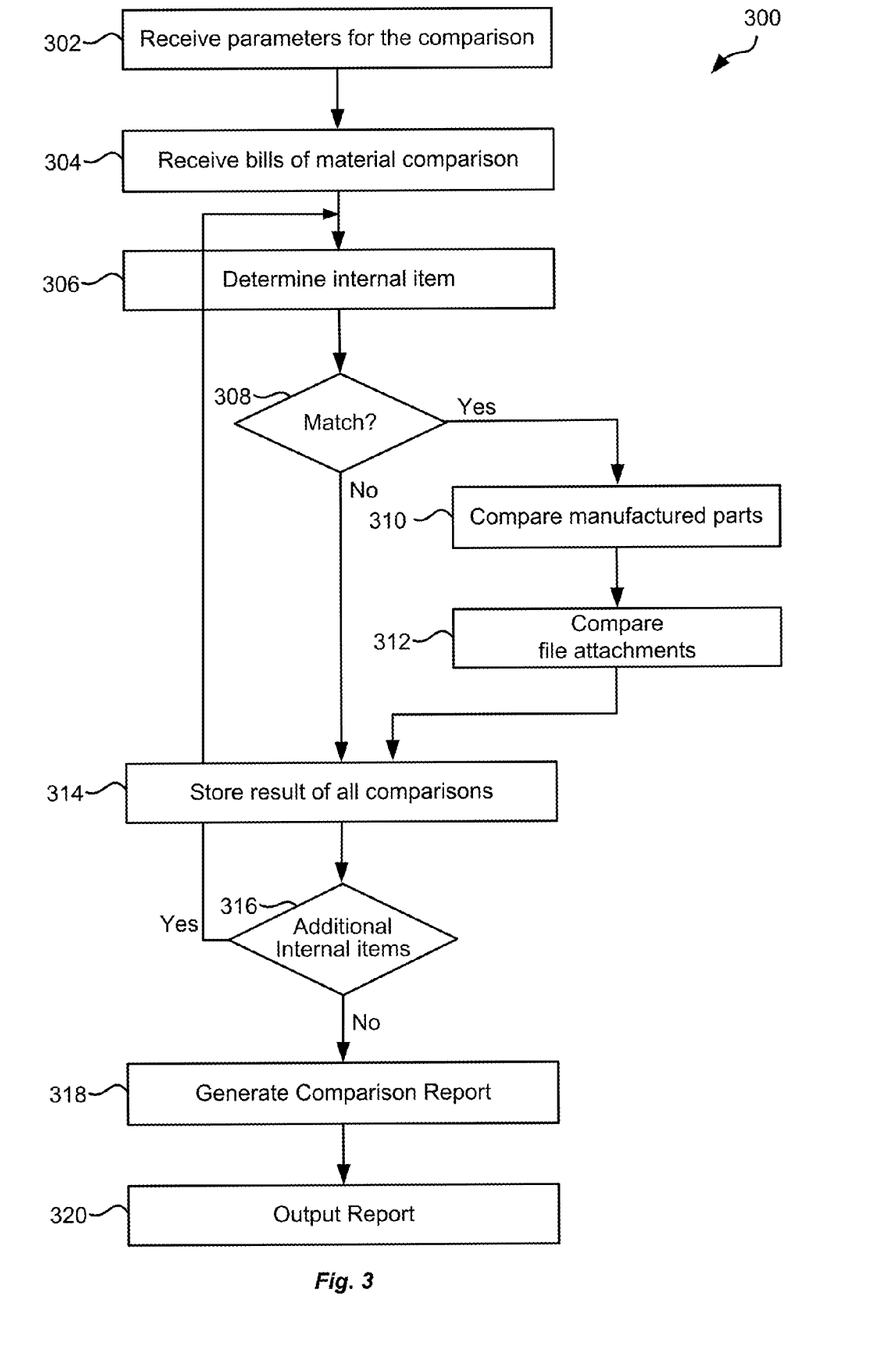
FIG. 3 depicts a simplified flowchart of a method for comparing bills of material according to one embodiment.

The comparison of bills of materials will be described in more detail. FIG. 3 depicts a simplified flowchart 300 of a method for comparing bills of material according to one embodiment. In step 302, comparison processor 104 receives parameters for the comparison. The parameters may indicate which component types to compare and the attributes of the component types to use in the comparison.

Figure 4:
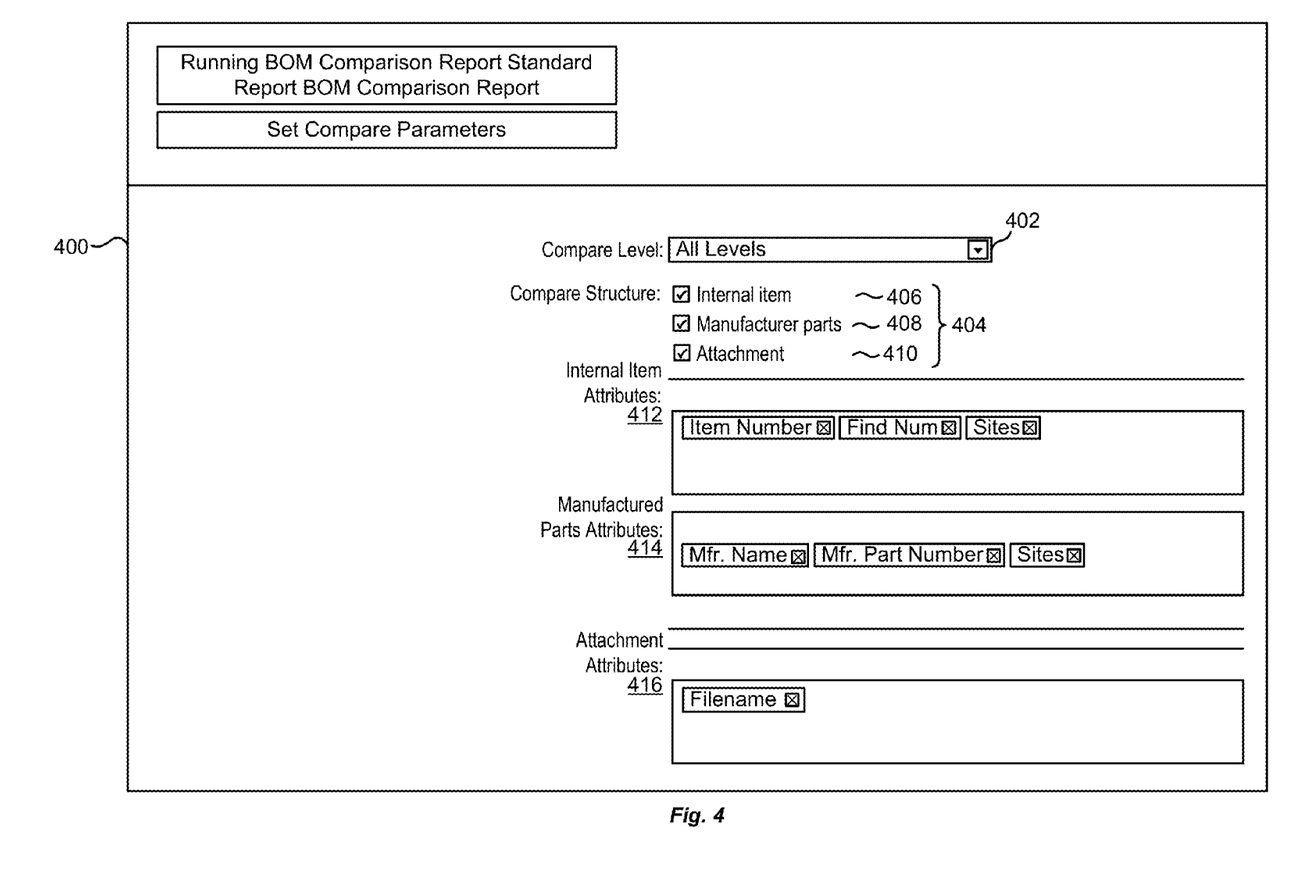
FIG. 4 depicts an example of an interface for configuring the parameters according to one embodiment.

FIG. 4 depicts an example of an interface 400 used to configure the parameters according to one embodiment. A compare level 402 is used to determine how many levels of the bills of materials to compare. For example, referring to FIG. 2, a first level at 204 may just be compared. However, a second level at 208 may also be compared. Other levels not shown may also be compared. In one example, the first level or all levels may be set.

The data structure may be arranged in rows. A row may be a position in both data structures that is compared to determine if a component matches.

A compare structure 404 is used to set what components should be compared. An internal item 406 parameter may be set to compare the internal item. A manufacturer part parameter 408 may be set to indicate that manufacturer parts should be compared for matching internal item rows. An attachment attribute 410 may be set to compare attachments for matching internal rows.

An internal item attributes entry 412 allows the attributes to be set that are used to determine if components in the BOMs are a match. For example, a set of attributes is used as a unique identifier to determine if BOM rows match. If both internal items have the same unique identifier in a row, a match is determined. In one example, the combination of an item number, find number, and sites is used to determine if components match in two bills of material.

Manufacturer part attributes 414 are used to set the attributes to determine if manufacturer parts match. In one example, manufacturer name, manufacturer part number, and sites may be set and constitute a unique identifier for a manufacturer part for a row.

Attachment attributes 416 are attributes that are used to determine if attachments match. As shown, a file name may be set that constitutes a unique identifier for an attachment row.

Referring back to FIG. 3, in step 304, comparison processor 104 receives bills of material for comparison. For example, the data structures for both bills of material may be retrieved from storage.

In step 306, comparison processor 104 determines an internal item in BOM #1. In step 308, comparison processor 104 determines if a matching internal item is included in BOM #2. In one embodiment, the attributes defined in the configuration parameters are used to determine if the same internal item is found. For example, the combination of attributes is used as a unique identifier of a BOM row in the data structure for BOM #1 and BOM #2. If the same unique identifier is found in the same row of both BOM #1 and BOM #2, then a match is found. If a match is not found, the process continues to step 314, described below.

If a match is found, an additional comparison of secondary attributes may be performed. For example, differences in secondary attributes are highlighted in the comparison report. However, these differences in secondary attributes do not cause the item to be considered not matching. Rather, the combination of attributes used as the unique key determines whether the item matches. The secondary attributes highlight differences within a matching item, such as differences in quantity.

If a match is found for the same internal item, a comparison of associations, such as manufacturer parts and file attachments, may be performed. It is assumed for discussion purposes that a comparison of manufacturer parts and file attachments was set in the configuration parameters; however, it will be understood that the manufacturer part and/or attachment comparison is optional. In step 310, comparison processor 104 compares manufacturer parts. The attributes defined in the configuration are used as a unique identifier of a manufacturer part row in both BOMs.

Also, in step 312, a comparison of the file attachments is performed. The attributes of the configuration parameters are used as a unique identifier of a file attachment row in both BOMs.

In step 314, a result of all of the comparisons is stored. For example, the results of the internal item, manufacturer part, and file attachment comparisons are stored. In step 316, it is determined if additional items should be compared. If so, the process reiterates to step 306 to determine another internal item for BOM #1 or BOM #2.

If additional items do not need to be compared, in step 318, comparison processor 104 generates a BOM comparison report based on the stored results of the comparisons. The BOM comparison report will be described in more detail below.

In step 320, the report is output. For example, the report may be displayed on interface 108. In other embodiments, the report may be stored or e-mailed.

Figure 5:
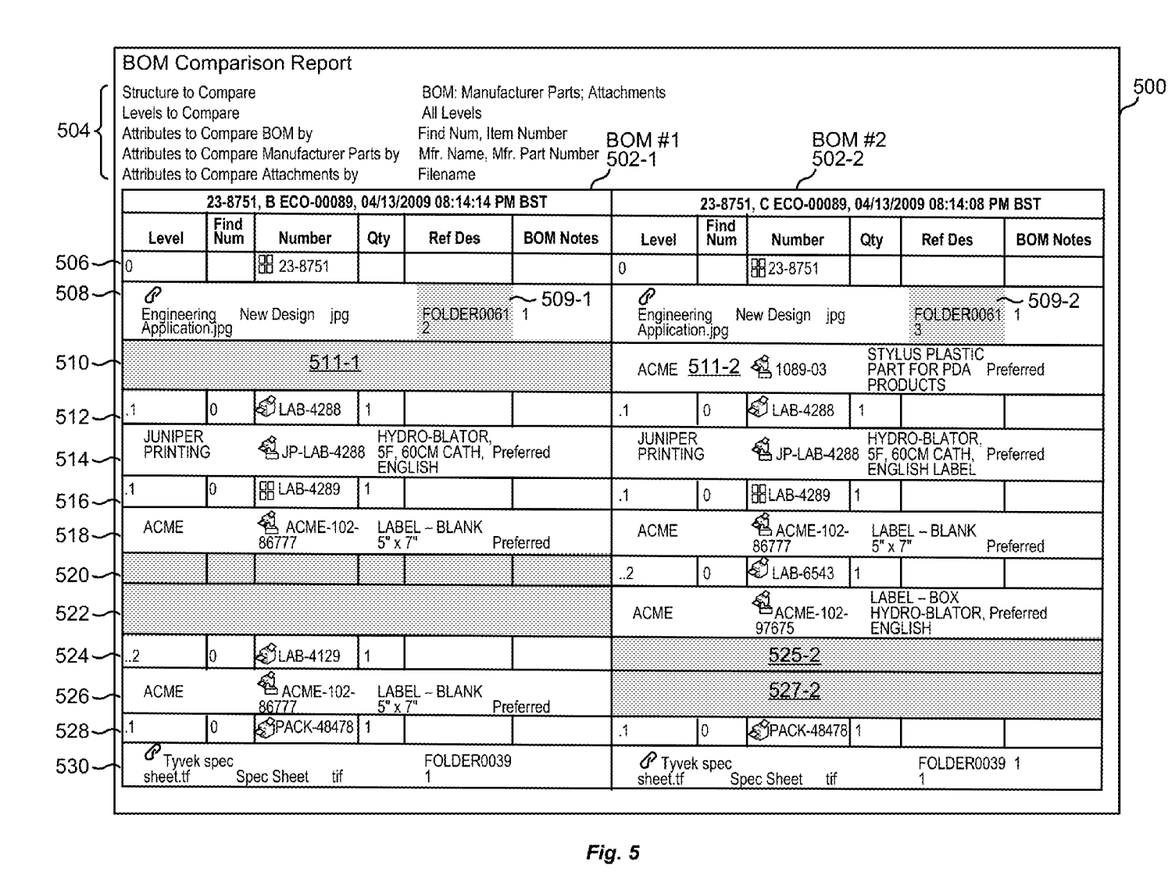
FIG. 5 shows an example of a bill of material comparison report according to one embodiment.

FIG. 5 shows an example of a bill of material comparison report according to one embodiment. Comparison report 500 shows a side-by-side comparison of two BOMs. A side-by-side comparison allows a user to easily determine the differences between BOMs. A grid 502-1 shows a BOM #1 and a grid 502-2 shows a BOM #2. Rows show components of the BOM, such as an internal item, a manufacturer part, or a file attachment. The differences in the rows may be highlighted using different coloring, shading, or any other characterization.

The configuration parameters that were used in the comparison are shown at 504. For example, the structure to compare, levels to compare, and attributes for the internal items, manufacturer parts, and file attachments are shown. In this case, the internal items are to be compared based on a Find Number (Find Num) and Item Number. Find Number may be a numeric sequence number for BOM rows. Item Number may be an item identifier that is assigned internally at an entity. The manufacturer part attributes used in the comparison are manufacturer name (Mfr Name) and manufacturer part number (Mfr Part Number). Also, the attributes for the file attachments are File Name, which may be the name or another identifier (e.g., pathname, directory) assigned to the file.

The top level product is identified by a number in a row 506 and matches for both BOM #1 and BOM #2. Before carrying out a comparison of associations, comparison processor 104 also compares other secondary attributes on the item row, and if any differences are found, those differences are displayed in the report, such as by shading. If any differences are found for secondary attributes, the differences may be called out, but the items are shown on the same row as matching items. For example, the BOM data may contain the following information about each internal part on the BOM: Find Number, Item Number, Quantity, Sites, RefDes, Notes. The specified parameters are what attributes are used to compare by—in other words, what attributes constitute a unique key for matching purposes. If the attributes are Find Number, Item Number and Site—which means if these attributes match between rows in the two structures, the rows are considered matching and are put side by side. Now, in these rows, if a secondary attribute, such as quantity, is different, then that difference is called out by shading the corresponding column. Similar comparisons are performed for attachment and manufacturer part rows (comparing attributes and calling out differences if the unique key matches), and is illustrated at 509-1 and 509-2.

An attachment is shown in a row 508 for the top level product. This attachment is compared by the file name, which is the same for BOM #1 and #2. However, a difference in a secondary attribute of the reference description is shown at 510. This difference has been highlighted using a different color or shading at 509-1 and 509-2.

A manufacturer part has been compared in row 510. As shown, a matching manufacturer part in BOM #1 is not found and is highlighted at 511-1. In 511-2, the manufacturer part of Acme, with the manufacturer part of 1098-03 is provided. Color or shading is shown in box 511-1 is used to indicate that a matching manufacturer part is not found in BOM #1.

In a first level of the BOMs, at row 512, an internal item of lab-4288 is shown. These items match in BOM #1 and BOM #2. A matching manufacturer part is shown in a row 514 also. Row 516 shows another internal item that matches for BOM #1 and BOM #2 of the item number of lab-4289 and row 518 shows a matching manufacturer part.

At row 524, a second level of an internal item is shown. This item is a child of the item shown in row 516. In this case, a matching internal item is not found in BOM #2 and this is highlighted in entry 525-2. In row 526, a non-matching manufacturer part is shown in entry 527-2. In this case, the internal items do not match and the manufacturer part comparison does not need to be performed because it follows naturally that the manufacturer part would not match for the unmatched internal item. The unmatched manufacturer part is shown but the comparison may not be performed to determine the unmatched row.

In a row 528, the internal item on the first level matches. Additionally, a file attachment in row 530 matches. No markings are thus shown.

Accordingly, a user may view report 500 and quickly determine the differences between BOM #1 and BOM #2. The color coding or shading highlights the differences. The user can quickly look at report 500 and determine that components are missing or different. The side-by-side comparison allows the determination to be made quickly and easily.

Figure 6:
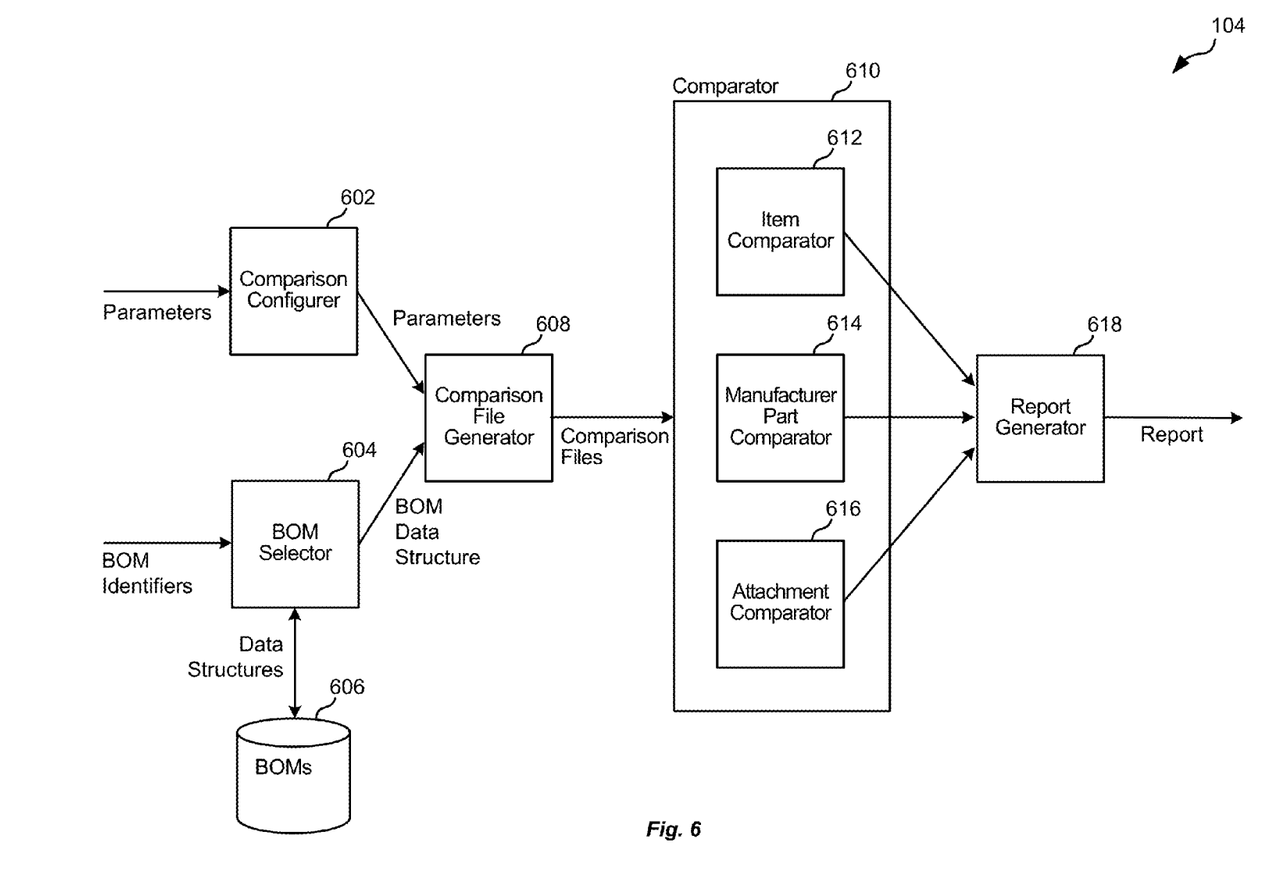
FIG. 6 shows a more detailed embodiment of a comparison processor according to one embodiment.

The comparison process will now be described in more detail. FIG. 6 shows a more detailed embodiment of comparison processor 104 according to one embodiment. A comparison configurer 602 receives parameters. For example, the parameters may be set using interface 400.

A BOM selector 604 is configured to receive BOMs for a comparison. For example, identifiers for BOMs may be received. BOM selector 604 is configured to retrieve the database structure for the BOMs from database 606. The parameters and database structure are sent to a comparison structure generator 608. Comparison structure generator 608 generates the structure that is used in the comparison. For example, the BOM may be stored in a database format in database 606. A comparison structure is generated based on the hierarchy of the BOM and the configured parameters. For example, only certain items from the database structure need to be compared based on the configuration parameters. Comparison structure generator 608 determines which information is needed (e.g., the filename if the filename is going to be used in the comparison) and generates a comparison file with this information. The file may also be structured such that the hierarchy of the bill of material is preserved. If the parameter "compare attachment structures" is checked, the contents of the attachments for the attributes are included in the XML source file. If the parameter "compare manufacturer parts structures" is checked, the contents of the manufacturer parts based on the attributes selected is included in the XML source file.

The comparison files are then input into a comparator 610. Comparator 610 includes an item comparator 612, a manufacturer part comparator 614, and an attachment comparator 616. These comparators are configured to compare the items, manufacturer parts, and attachments. The results are provided to a report generator 618, which can generate the report.

Figure 7:
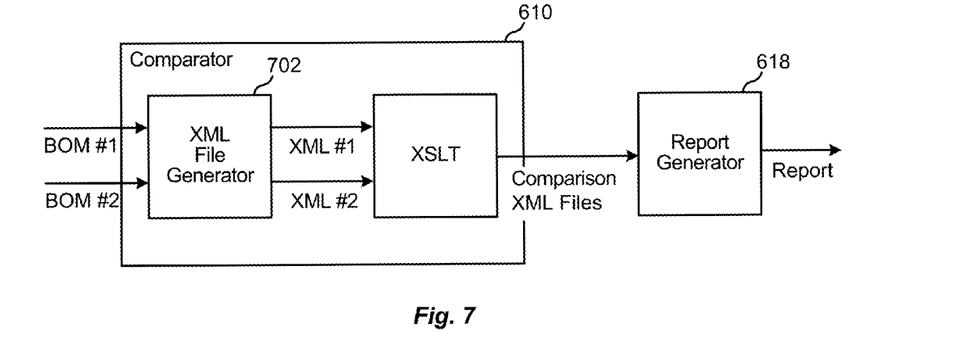
FIG. 7 shows an example of a comparator according to one embodiment.

In one example, an extensible markup language (XML) file is generated for each BOM. Although XML is described, it will be understood that any language or format may be used. FIG. 7 shows a more detailed embodiment of comparator 610 according to one embodiment. Comparator 610 includes an XML generator 702. FIG. 7 shows multiple XML source files that are generated and compared. In one embodiment, a reference ID and unique ID are used to identify equivalent rows in both XML files. The information included in the XML source file is based on the parameters provided in the configuration. For each line of the bill of material, information for the attributes for the comparison are retrieved from the database file.

A template or comparison file, such as an extensible style language transformation (XSLT) file, is used to compare the two XML source files to generate an output XML source file for the report. For the comparison, the components may be arranged in an order for both BOMs based on the attributes. Each component in the order may be a row. The comparison may be performed by comparing each component from the top down once the components have been arranged in the order based on one or more attributes, such as the find number followed by an item number. Whenever a find number is specified, internal items at the same find number are compared side-by-side before moving on to the next level. If the same item number exists on the same level of the ordering but different find numbers on the two BOMs being compared, then a deficiency (i.e., no match) is found. When comparing two multi-level structures side-by-side, if a row increment causes one of the BOM structures to run into the next level while the other BOM structure does not, the component(s) of the second structure of that find number and its children are completely traversed before moving on to the next find number. These components of the second structure may be reported as differences before moving on to the next find number.

The comparison of manufacturer parts or attachment data may be carried out only for rows where the items match between the two BOM structures. For BOM rows that do not match, the item rows and attachment/manufacturer part rows are shown as unmatched. The comparison is not performed because if the items do not match, then it is assumed that the attachment and manufacturer part rows also do not match.

For a manufacturer part comparison, the manufacturer part records may be sorted based on the attributes selected. For example, they may be sorted in the order of manufacturer name followed by manufacturer part number for both BOM structures. The combination of attributes selected in the parameter configuration is used to determine whether or not there is a match between rows of the two structures. Rows where the manufacturer name and manufacturer part number are identical are considered a match. When there is a match in the manufacturer name, all records for that manufacturer are compared before moving on to the next manufacturer.

The file attachment comparison may be performed by sorting the attachment files in the order of attachment name followed by folder number for both BOM structures. The combination of attributes configured in the parameter selection is used to determine whether or not there is a match between rows for the two BOM structures. For example, if the file name is selected, files that include the same file name in the same row are considered matches.

Accordingly, a report is provided that compares multi-level bills of material. A comparison of associations allows users to determine differences at another level of detail. For example, an internal item may not change but the manufacturer part may change. Understanding this difference may be important to a user manufacturing the product.

Although the description has been described with respect to particular embodiments thereof, these particular embodiments are merely illustrative, and not restrictive. It will be understood that variations to the components of the bill of material may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
receiving a configuration specifying which components and which attributes of components of a first multilevel bill of material and a second multilevel bill of material are to be compared, where a component may include internal items used to manufacture an end part and an association to the internal item, where the association may be manufacturer parts and/or file attachments, and where an attribute is information about a component used to identify whether the components match;
comparing, by a computer processor, attributes of one or more internal items of the first and second multilevel bills of material to determine differences between the attributes of one or more internal items in the first multilevel bill of material and attributes of corresponding internal items in the second multilevel bill of material to identify an internal item in the first multilevel bill of material that matches an internal item in the second multilevel bill of material;
comparing, by the computer processor, attributes of one or more associations for identified matched internal items of the first and second multilevel bills of material to determine differences between the one or more associations of the identified matched internal item in the first multilevel bill of material and the one or more associations of the identified matched internal item in the second multilevel bill of material;
generating a report showing a side-by-side result of comparing the one or more internal items and comparing the one or more associations, wherein the report shows which internal items of the first multilevel bill of material are not matched with internal items of the second multilevel bill of material and shows which of the one or more associations of the identified matched internal item of the first multilevel bill of material are not the same as the one or more associations of the identified matched internal item of the second multilevel bill of material; and
outputting the report.

2. The method of claim 1, wherein the internal items comprise parts for an end product.

3. The method of claim 1, wherein the one or more associations comprise manufacturer parts, wherein differences between manufacturer parts for matching internal items are determined.

4. The method of claim 1, wherein the one or more associations comprise file attachments, wherein differences between file attachments for matching internal items are determined.

5. The method of claim 1, further comprising:
retrieving a database structure for each of the first multi-level bill of material and the second multi-level bill of material;
generating a first comparison structure for the first multi-level bill of material based on the configuration; and
generating a second comparison structure for the second multi-level bill of material based on the configuration.

6. The method of claim 5, wherein information in the database structure is different from information in the first comparison structure or the second comparison structure.

7. The method of claim 6, wherein the differences are highlighted by a characterization.

8. The method of claim 1, wherein the one or more associations are not compared when an internal item of the first and second bills of material does not match.

9. The method of claim 1, wherein outputting comprises displaying the report, the displayed report highlighting unmatched internal items and unmatched associations.

10. A computer-readable storage medium comprising encoded logic for execution by one or more computer processors, the logic when executed is executable to:

receive a configuration specifying which components and which attributes of components of a first multilevel bill of material and a second multilevel bill of material are to be compared, where a component may include internal items used to manufacture an end part and an association to the internal item, where the association may be manufacturer parts and/or file attachments, and where an attribute is information about a component used to identify whether the components match;

compare, by the one or more computer processors, attributes of one or more internal items of the first and second multilevel bills of material to determine differences between the attributes of one or more internal items in the first multilevel bill of material and attributes of corresponding internal items in the second multilevel bill of material to identify an internal item in the first multilevel bill of material that matches an internal item in the second multilevel bill of material;

compare, by the one or more computer processors, attributes of one or more associations for identified matched internal items of the first and second multilevel bills of material to determine differences between the one or more associations of the identified matched internal item in the first multilevel bill of material and the one or more associations of the identified matched internal item in the second multilevel bill of material;

generate a report showing a side-by-side result of comparing the one or more internal items and comparing the one or more associations, wherein the report shows which internal items of the first multilevel bill of material are not matched with internal items of the second multilevel bill of material and shows which of the one or more associations of the identified matched internal item of the first multilevel bill of material are not the same as the one or more associations of the identified matched internal item of the second multilevel bill of material; and output the report.

11. The computer-readable storage medium of claim 10, wherein the internal items comprise parts for an end product.

12. The computer-readable storage medium of claim 10, wherein the one or more associations comprise manufacturer parts, wherein differences between manufacturer parts for matching internal items are determined.

13. The computer-readable storage medium of claim 10, wherein the one or more associations comprise file attachments, wherein differences between file attachments for matching internal items are determined.

14. The computer-readable storage medium of claim 10, wherein the logic when executed is further executable to:
retrieve a database structure for each of the first multi-level bill of material and the second multi-level bill of material;
generate a first comparison structure for the first multilevel bill of material based on the configuration; and
generate a second comparison structure for the second multilevel bill of material based on the configuration.

15. The computer-readable storage medium of claim 10, wherein the one or more associations are not compared when an internal item of the first and second bills of material does not match.

16. The computer-readable storage medium of claim 10, wherein logic executable to output comprises logic executable to display the report, the displayed report highlighting unmatched internal items and unmatched associations.

17. An apparatus comprising:
one or more computer processors; and
logic encoded in one or more computer readable storage media for execution by the one or more computer processors and when executed executable to:
receive a configuration specifying which components and which attributes of components of a first multilevel bill of material and a second multilevel bill of material are to be compared, where a component may include internal items used to manufacture an end part and an association to the internal item, where the association may be manufacturer parts and/or file attachments, and where an attribute is information about a component used to identify whether the components match;

compare, by the one or more computer processors, attributes of one or more internal items of the first and second multilevel bills of material to determine differences between the attributes of one or more internal items in the first multilevel bill of material and attributes of corresponding internal items in the second multilevel bill of material to identify an internal item in the first multilevel bill of material that matches an internal item in the second multilevel bill of material;

compare, by the one or more computer processors, attributes of one or more associations for identified matched internal items of the first and second multilevel bills of material to determine differences between the one or more associations of the identified matched internal item in the first multilevel bill of material and the one or more associations of the identified matched internal item in the second multilevel bill of material;

generate a report showing a side-by-side result of comparing the one or more internal items and comparing the one or more associations, wherein the report shows which internal items of the first multilevel bill of material are not matched with internal items of the second multilevel bill of material and shows which of the one or more associations of the identified matched internal item of the first multilevel bill of material are not the same as the one or more associations of the identified matched internal item of the second multilevel bill of material; and output the report.

* * * * *

UNITED STATES PATENT AND TRADEMARK OFFICE
CERTIFICATE OF CORRECTION

PATENT NO. : 8,380,588 B2  
APPLICATION NO. : 12/687871  
DATED : February 19, 2013  
INVENTOR(S) : Batra et al.

Page 1 of 1

It is certified that error appears in the above-identified patent and that said Letters Patent is hereby corrected as shown below:

Title page, in column 2, under "Other Publications", line 5, delete "Tonn" and insert -- Tonne --, therefor.

In the Specifications

In column 2, line 63, delete "side by side" and insert -- side-by-side --, therefor.

In column 4, line 39, delete "manufacturer" and insert -- manufacture --, therefor.

In column 6, line 59, delete "side by side." and insert -- side-by-side. --, therefor.

Signed and Sealed this
Fourteenth Day of May, 2013

Teresa Stanek Rea
*Acting Director of the United States Patent and Trademark Office*